United States Patent Office 2,905,719
Patented Sept. 22, 1959

2,905,719

SURFACE-ACTIVE ACETALS AND FORMALS

Peter L. de Benneville and Homer J. Sims, Philadelphia, Pa., assignors to Rohm & Haas Company, Philadelphia, Pa., a corporation of Delaware No Drawing. Application September 24, 1957
Serial No. 685,793

10 Claims. (Cl. 260—609)

The present invention concerns specific surface-active acetals and formals. It is further concerned with specific surface-active acetals and formals that are stable under alkaline or neutral conditions but which may be altered by acidic conditions. This alteration may take the form of changing an oil-soluble, surface-active compound to one of no surface activity or a water-soluble, surface-active compound to one of no surface activity. This invention also concerns a method for the preparation of the specific surface-active acetals and formals.

A wide variety of non-ionic surface-active agents is known in the art and usually these are stable in acid, basic, and neutral media. In many applications it is necessary or at least highly desirable to remove or change the surface activity of an agent at some critical point in the operation. For example, if an ordinary non-ionic surface-active agent is used to remove oils and waxes from raw wool by emulsification, there is obtained an emulsion in water which is not easily broken, either for the recovery of the oils and waxes or purposes of disposal. Also, the effluent from commercial laundries using non-ionic detergents remains highly surface active causing many troublesome problems of foaming and disposal. Further, when non-ionic surface-active agents are used for the recovery of petroleum, there is obtained an emulsion which is not easily broken without the use of certain complex and expensive demulsifying agents. The present compounds can be used in all of the above situations by employing a step in which the objectionable emulsions are treated with dilute acids which, since there is an alteration in the surface-active properties of the present compounds, permits the ready and effective conclusion of the operations described heretofore. The subject compounds may also be used in the preparation of emulsion polymers which can later be coagulated if desired in fiber form by treatment with dilute acids. The present compounds are useful general purpose detergents that exhibit low foam, good detergency, and high cloud points.

The acid-sensitive non-ionic surface-active acetals and formals of this invention may be represented by the formula

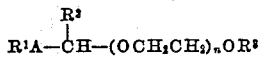

in which $R^1$ represents an alkyl group of 8 to 18 carbon atoms, $R^2$ is a hydrogen atom or a methyl group, $R^3$ is a lower alkyl group, A is a chalcogen having an atomic weight of 16 to 32, i.e., oxygen or sulfur, and $n$ is an integer from 3 to about 50. $R^1$ may typically be octyl, nonyl, decyl, dodecyl, octadecyl, or the like. $R^1$ may exhibit any of the known spatial configurations such as normal, iso, or tertiary.

$R^2$ has been stated as representing a hydrogen atom or a methyl group. When $R^2$ represents hydrogen a formal structure is obtained and when $R^2$ represents a methyl group an acetal structure is obtained.

$R^3$ is a lower alkyl group containing from 1 to 4 carbon atoms and may be represented by methyl, ethyl, isopropyl, tert-butyl, and the like.

The integer $n$ varies from 3 to about 50. When $n$ ranges from about 3 to 5, the product is substantially oil-soluble, and when $n$ ranges from 6 to about 50, the product is substantially water-soluble.

The present compounds are preferably prepared by reacting a compound having the formula

with one having the formula $$R^3O(CH_2CH_2O)_nH$$

in which X is chlorine or bromine. The reaction is conducted in the presence of a strong basic inorganic neutralizing agent. Among the basic agents that may be employed are the alkali metals, such as sodium and potassium, the alkali metal hydroxides, such as sodium hydroxide, potassium hydroxide, or lithium hydroxide, alkaline earth metal hydroxides, such as barium hydroxide, calcium hydroxide, and strontium hydroxide, alkali metal carbonates such as sodium carbonate and potassium carbonate, and the like. The basic agent should be present in an amount somewhat greater than an equivalent amount of the reactants in order to assure the complete neutralization of the hydrochloric or hydrobromic acid formed in the reaction.

As an alternative method for preparing members having acetal structures, there may be used a reaction between a specific vinyl ether with a defined alcohol in the presence of an acidic catalyst. In this instance the reactants may be represented by the formulas $$R^1ACH=CH_2$$

and $$R^3O(CH_2CH_2O)_nH$$

and the acidic catalysts may be typically concentrated hydrochloric acid, concentrated sulfuric acid, syrupy phosphoric acid, boron trifluoride, or boron trifluoride coordinated complexes.

The compounds of this invention are prepared by conducting the reaction in the temperature range of about 40° to 100° C., preferably 50° to 70° C. When a halogenated reactant is employed the reaction is exothermic in nature. It is preferable to add to the reaction system the alcohol reactant and the acidic catalyst or basic agent, as the case may be, and then introduce the other reactant, the vinyl ether or the halogenated compound, as the case may be. Such a procedure assures a maximization of yields and minimization of undesired side reactions. Reaction time is not critical but generally will vary from about 30 minutes to ten hours or more depending largely on the individual reactants employed. A solvent is not required in this reaction but sometimes, in order to aid in the separation of the inorganic salt by-product formed when the halogenated reactant is employed, it may be advantageous to employ a volatile inert organic solvent such as benzene, toluene, or the like.

Typical reactants that may be employed include:

$$C_8H_{17}OCH_2Cl$$
$$C_9H_{19}OCH_2Br$$

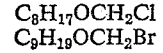

$$C_{12}H_{25}OCH_2Cl$$
$$C_{12}H_{25}SCH_2Cl$$

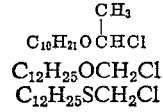

$$C_{16}H_{33}OCH_2Cl$$

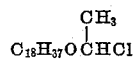

$C_{18}H_{37}OCHCl$ with $CH_3$ on the carbon $C_{18}H_{37}SCH_2Br$
$CH_3O(CH_2CH_2O)_3H$
$C_2H_5O(CH_2CH_2O)_5H$
$C_2H_5O(CH_2CH_2O)_9H$
$CH_3O(CH_2CH_2O)_{15}H$
$CH_3O(CH_2CH_2O)_{20}H$
$C_2H_5O(CH_2CH_2O)_{30}H$
$C_3H_7O(CH_2CH_2O)_{40}H$
$C_4H_9O(CH_2CH_2O)_{50}H$ and $CH_3O(CH_2CH_2O)_{50}H$
$C_8H_{17}OCH=CH_2$
$C_{10}H_{21}OCH=CH_2$
$C_{12}H_{25}SCH=CH_2$
$C_{12}H_{25}OCH=CH_2$
$C_{14}H_{29}OCH=CH_2$
$C_{18}H_{37}SCH=CH_2$ and $C_{18}H_{37}OCH=CH_2$ The reactants of this invention are known compounds or readily prepared by known methods. In the preparation of the ethoxyalcohol reactants having 3 to 50 ethoxy units, there is frequently obtained a mixture of compounds having different members of ethoxy units. This is known in the art and is no deterrent to the present reaction since satisfactory and useful compounds are formed from the mixtures of compounds in the same way as the individual compounds. It is to be understood, therefore, that the integer $n$ stands for either the number of ethoxy units in a single compound or an average value in a mixture of compounds.

At the conclusion of the reaction, if a halogenated reactant is used, the halide salt formed as a reaction by-product is removed by filtration. The product is obtained as the filtrate. If a solvent has been employed, as indicated previously, it may be removed by stripping in a conventional manner. Even if a solvent has not been employed during the course of the reaction, the use of one is often advantageous in the isolation of the product in order to facilitate the removal of the inorganic halide salt formed. When a vinyl ether reactant is used the reaction medium is neutralized at the conclusion of the reaction by the addition of sodium hydroxide or the like. The resulting neutralization product may be removed by filtration, if desired, but since the amount of such is relatively small and does not interfere with the desired product no further operations of isolation are usually conducted.

The products of this invention, having the utilities previously stated, possess the hydrophobic-hydrophilic balance required for a substance to exhibit surface activity. As has been presented previously it is frequently desirable to employ a surface-active material at one stage of a process and not have such material interfere at a later stage of the process. The present compound may be used as valuable surface-active agents at one stage of a process and then chemically altered to lose surface-activity at a later stage of the process. The present compounds are quite stable in alkaline or neutral media, but may be chemically altered in an acidic medium, particularly at temperatures approaching about 100° C. Hydrochloric acid or the like is particularly convenient and effective for use in this respect and the change is effected usually in a manner of minutes, such as 5 or 10, depending largely on the temperatures and compounds involved. The present compound is split into three fragments, one an oily water-insoluble compound, one an ether alcohol, and the third a volatile aldehyde, none of which is surface active. Therefore, a compound is available that is surface active during its period of use when surface activity is demanded and which can be readily altered to yield compounds that are no longer surface active and that can be readily disposed of when such conditions are required.

The compounds of this invention, as well as the methods for their preparation, may be more fully understood from the following examples which are offered by way of illustration and not by way of limitation. Parts by weight are used throughout.

*Example 1*

There are introduced into a reaction vessel 15 parts of powdered potassium hydroxide and 121 parts of $CH_3O(CH_2CH_2O)_9H$ There is then added 58.6 parts of chloromethyl lauryl ether at a rate sufficient to maintain a temperature of about 45° C. The reaction mixture is then heated to 75° C. for one hour and then filtered while hot. The filtrate forms two layers, the lower layer of 120.5 parts containing the product. The product is water soluble and surface active and is identified as dodecoxymethoxy-nonaethoxy methane, $C_{12}H_{25}OCH_2O(CH_2CH_2O)_9CH_3$.

In a similar manner there are prepared $C_{12}H_{25}OCH_2O(CH_2CH_2O)_{15}CH_3$
and $C_{12}H_{25}OCH_2O(CH_2CH_2O)_{20}CH_3$
$C_{18}H_{37}OCH_2O(CH_2CH_2O)_{50}C_4H_9$

*Example 2*

There are placed in a reaction vessel 16 parts of powdered potassium hydroxide and 121 parts of $CH_3O(CH_2CH_2O)_9H$ The system is heated to 60° C. for 30 minutes. Over a period of one and one-half hours there are introduced 62 parts of α-chloroethyl dodecyl ether which maintains the temperature of the system at 50° to 55° C. The mixture is heated for an additional 30 minutes at 68° to 70° C. and then filtered to give 140 parts of a water-soluble, surface-active filtrate. The filtrate is the product which is identified as 1-(dodecoxy)-1-(methoxynona-ethoxy)ethane, $C_{12}H_{25}OCHO(CH_2CH_2O)_9CH_3$ with $CH_3$ on the CH There are prepared in like manner $C_8H_{17}OCHO(CH_2CH_2O)_3CH_3$ with $CH_3$ on the CH $C_9H_{19}OCHO(CH_2CH_2O)_5C_2H_5$ with $CH_3$ on the CH and $C_{10}H_{21}SCH_2O(CH_2CH_2O)_{12}CH_3$

*Example 3*

There is added to a reaction vessel 45.6 parts of $CH_3O(CH_2CH_2O)_9H$. Concentrated hydrochloric acid is introduced until a pH of two is obtained. There is then added dropwise with stirring 21.2 parts of dodecyl vinyl ether at steam bath temperature. During the addition of the ether which takes about one hour, the pH of the system is checked and more acid is introduced in order to maintain acidity at a level of pH=2. The mixture is stirred and heated at 62° to 68° C. for two additional hours. Then the mixture is made alkaline with about five drops of aqueous 50% sodium hydroxide solution. There is then added 65 parts of water and a sample of this diluted solution is further diluted with water to make an aqueous 1% solution. This solution is surface active and has a cloud point of 60° C. The solution is acidified and heated to 60° C. for a few minutes yielding acetaldehyde and lauryl alcohol. The surface activity is lost. The surface-active product is identified as 1-(dodecyloxy)-1-(methoxynonaethoxy)ethane.

In an analogous way, there are made

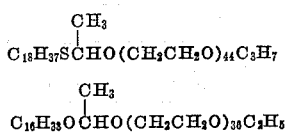

and

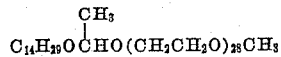

*Example 4*

There are added to a reaction vessel 46 parts of $CH_3O(CH_2CH_2O)_9H$ and sufficient concentrated sulfuric acid to make the system have a pH of two. There is then slowly added 26.8 parts of hexadecyl vinyl ether. The exothermic heat of reaction causes the temperature to rise to 40° C. The mixture is then heated at 50° C. for two hours, then at 100° C. for two more hours. On standing, two layers separated, the upper of which solidifies on prolonged standing. The solid portion is removed and the bottom layer consisting of 42 parts is soluble in water, surface active, and is identified as 1-(hexadecyloxy)-1-(methoxynonaethoxy)ethane.

In a similar way, there are prepared

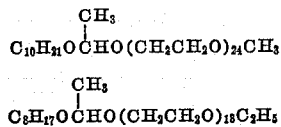

and

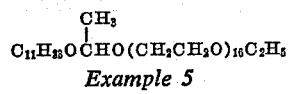

*Example 5*

There are added to a reaction vessel 45.6 parts of $CH_3O(CH_2CH_2O)_9H$ and 8.1 parts of commercial pulverized 85% potassium hydroxide. There is added dropwise over a period of 50 minutes, 27.8 parts of chloromethyl dodecyl thioether. The exothermic heat of reaction causes the temperature of the system to rise to about 50° C. The mixture is allowed to stand overnight at room temperature and then heated at 75° C. for one and one-half hours. The mixture is filtered while hot giving a filtrate of 68.5 parts which is water soluble and surface active. The product is identified as dodecyl-mercaptomethoxynonaethoxy methane

In like manner there are made

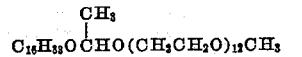

and

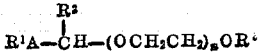

We claim:

1. A composition of matter having the formula $$R^1A-\underset{\underset{R^2}{|}}{CH}-(OCH_2CH_2)_nOR^3$$

in which $R^1$ is an alkyl group of 8 to 18 carbon atoms, $R^2$ is a member of the group consisting of a hydrogen atom and a methyl group, $R^3$ is a lower alkyl group, A is a chalcogen having an atomic weight of 16 to 32, and $n$ is an integer from 3 to about 50.

2. A composition of matter having the formula

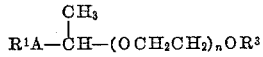

in which $R^1$ is an alkyl group of 8 to 18 carbon atoms, $R^3$ is a lower alkyl group, A is a chalcogen having an atomic weight of 16 to 32, and $n$ is an integer from 3 to about 50.

3. A composition of matter having the formula $$R^1A-CH_2(OCH_2CH_2)_nOR^3$$

in which $R^1$ is an alkyl group of 8 to 18 carbon atoms, $R^3$ is a lower alkyl group, A is a chalcogen having an atomic weight of 16 to 32, and $n$ is an integer from 3 to about 50.

4. A composition of matter having the formula

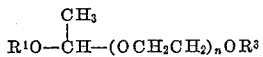

in which $R^1$ is an alkyl group of 8 to 18 carbon atoms, $R^3$ is a lower alkyl group, and $n$ is an integer from 3 to about 50.

5. A composition of matter having the formula $$R^1O-CH_2(OCH_2CH_2)_nOR^3$$

in which $R^1$ is an alkyl group of 8 to 18 carbon atoms, $R^3$ is a lower alkyl group, and $n$ is an integer from 3 to about 50.

6. A composition of matter having the formula $$C_{12}H_{25}OCH_2O(CH_2CH_2O)_9CH_3$$

7. A composition of matter having the formula

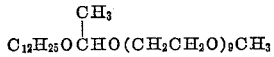

8. A composition of matter having the formula $$C_{12}H_{25}SCH_2O(CH_2CH_2O)_9CH_3$$

9. A composition of matter having the formula $$C_{18}H_{37}OCH_2O(CH_2CH_2O)_{50}C_4H_9$$

10. A composition of matter having the formula

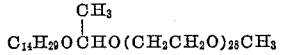

References Cited in the file of this patent

UNITED STATES PATENTS 2,205,021     Schuette et al. _____ June 18, 1940

OTHER REFERENCES

Cocker et al.: J. Chem. Soc. (London), 1930, 440–445.